Oct. 6, 1970 T. O. PAINE, DEPUTY 3,532,819

ADMINISTRATOR OF THE NATIONAL AERONAUTICS AND SPACE ADMINISTRATION

BURST SYNCHRONIZATION DETECTION SYSTEM

Filed Oct. 3, 1968 3 Sheets-Sheet 1

Phillip C. Lipoma
Bryant P. Seay, Jr.
INVENTORS

BY

M. J. Manock
ATTORNEYS

Oct. 6, 1970 T. O. PAINE, DEPUTY 3,532,819
ADMINISTRATOR OF THE NATIONAL AERONAUTICS
AND SPACE ADMINISTRATION
BURST SYNCHRONIZATION DETECTION SYSTEM
Filed Oct. 3, 1968 3 Sheets-Sheet 2

Phillip C. Lipoma
Bryant P. Seay, Jr.
INVENTORS

BY
ATTORNEYS

Oct. 6, 1970 T. O. PAINE, DEPUTY 3,532,819
ADMINISTRATOR OF THE NATIONAL AERONAUTICS
AND SPACE ADMINISTRATION
BURST SYNCHRONIZATION DETECTION SYSTEM
Filed Oct. 3, 1968 3 Sheets-Sheet 3

Phillip C. Lipoma
Bryant P. Seay, Jr.
INVENTORS

BY

M. J. Mernock
ATTORNEYS

United States Patent Office 3,532,819
Patented Oct. 6, 1970

3,532,819
BURST SYNCHRONIZATION DETECTION SYSTEM

T. O. Paine, Deputy Administrator of the National Aeronautics and Space Administration, with respect to an invention of Phillip C. Lipoma, Dickinson, and Bryant P. Seay, Jr., Houston, Tex.
Filed Oct. 3, 1968, Ser. No. 764,812
Int. Cl. H04n 5/04
U.S. Cl. 178—69.5 4 Claims

ABSTRACT OF THE DISCLOSURE

A burst synchronization detection system for a television system which employs repetitive bursts of a sine wave signal for synchronization purposes. The system operates to separate the synchronizing bursts from the remainder of the incoming signal and to supply such bursts to a phase locked loop which operates to lock a voltage controlled oscillator in the loop in synchronism with the sine wave component of the synchronizing bursts. Pulse type signals from the oscillator are supplied to a first pulse counter for producing horizontal sync pulses having the same repetition rate as the sync bursts. The horizontal sync pulses are supplied to a second pulse counter for producing vertical sync pulses having the same repetition rate as the vertical sync intervals in the incoming signal. A first comparison system compares the horizontal sync pulses with the oscillator signal and the incoming sync bursts for pulling the horizontal sync pulses into phase with the sync bursts. A second comparison system compares the vertical sync pulses with the oscillator signal and the incoming sync bursts to pull the vertical sync pulses into phase with the vertical sync intervals of the incoming signal. These comparison systems are comprised of various digital logic circuits.

BACKGROUND OF THE INVENTION

The invention described herein was made in the performance of work under a NASA Contract and is subject to the provisions of Section 305 of the National Aeronautics and Space Act of 1958, Public Law 85-568 (72 Stat. 435, 42 U.S.C. 2457).

The Apollo space program being conducted by the National Aeronautics and Space Administration will employ a television system for transmitting back to earth pictures of the astronauts during the course of their journey and lunar exploration. Because of problems inherent in transmitting pictures from a spacecraft at lunar distances, it is planned to use a slow-scan narrow bandwidth television system. In such a system, the horizontal deflection synchronizing signals will be transmitted in the form of short periodic bursts of a sine wave signal. The vertical deflection synchronizing signals will be of a similar nature except of a somewhat longer duration.

The present invention is concerned with the detection of these types of synchronizing signals when the television signal from the spacecraft is received back on the earth. As such, the invention will be used in various ground receiving stations and in various television receivers which will be modified to handle this type of a television signal.

It has been proposed to detect a sine wave burst type of synchronization signal by using a band-pass filter whose output signal envelope is detected and fed into a level detector, the output signal of which is used to trigger a synchronizing pulse generator or otherwise develop the desired synchronizing pulses. Systems of this type have been explored and found unsatisfactory. It was found that this type of detection system exhibited undesired amounts of time delay between the incoming synchronizing bursts and the synchronizing pulses generated therefrom. This was found to be due principally to the rise time of the band-pass filter. It was also found that when the envelope was detected and fed to the level detector, the amount of time delay changed as the signal level of the incoming signal changed. The noise rejection properties of this system were also found to be unfavorable.

SUMMARY OF THE INVENTION

It is an object of the invention, therefore ,to provide a new and improved burst synchronization detection system which is relatively insensitive to signal level variations in the incoming signal.

It is another object of the invention to provide a new and improved burst sync detection system for producing synchronizing pulses having a minimum of delay with respect to the sync bursts of the incoming signal.

It is a further object of the invention to provide a new and improved burst sync detection system which exhibits good noise rejection properties.

In accordance with the invention, there is provided a synchronizing signal detection system for use in communications systems which employ repetitive bursts of a higher frequency burst signal for synchronization purposes. Such detection system comprises circuit means for supplying a communications signal including such repetitive synchronizing bursts. The detection system also includes an oscillator circuit for generating a signal having a nominal frequency corresponding to the burst signal freqeuncy. The detection system further includes circuit means responsive to the burst signal portion of the communications signal for pulling and holding the oscillator frequency in synchronism with the burst signal frequency. The detection system also includes frequency divider means responsive to the oscillator signal for generating synchornizing pulses having the same repetition rate as the synchronizing bursts. The detection system additionally includes comparison circuit means responsive to the synchronizing pulses and the synchronizing bursts for pulling and holding the pulses and bursts in phase with one another.

For a better understanding of the present invention, together with other and further objects and features thereof, reference is had to the following description taken in connection with the accompanying drawings, the scope of the invention being pointed out in the appended claims

BRIEF DESCRIPTION OF THE DRAWINGS

Referring to the drawings.

DESCRIPTION OF THE PREFERRED EMBODIMENT

Figure 1:
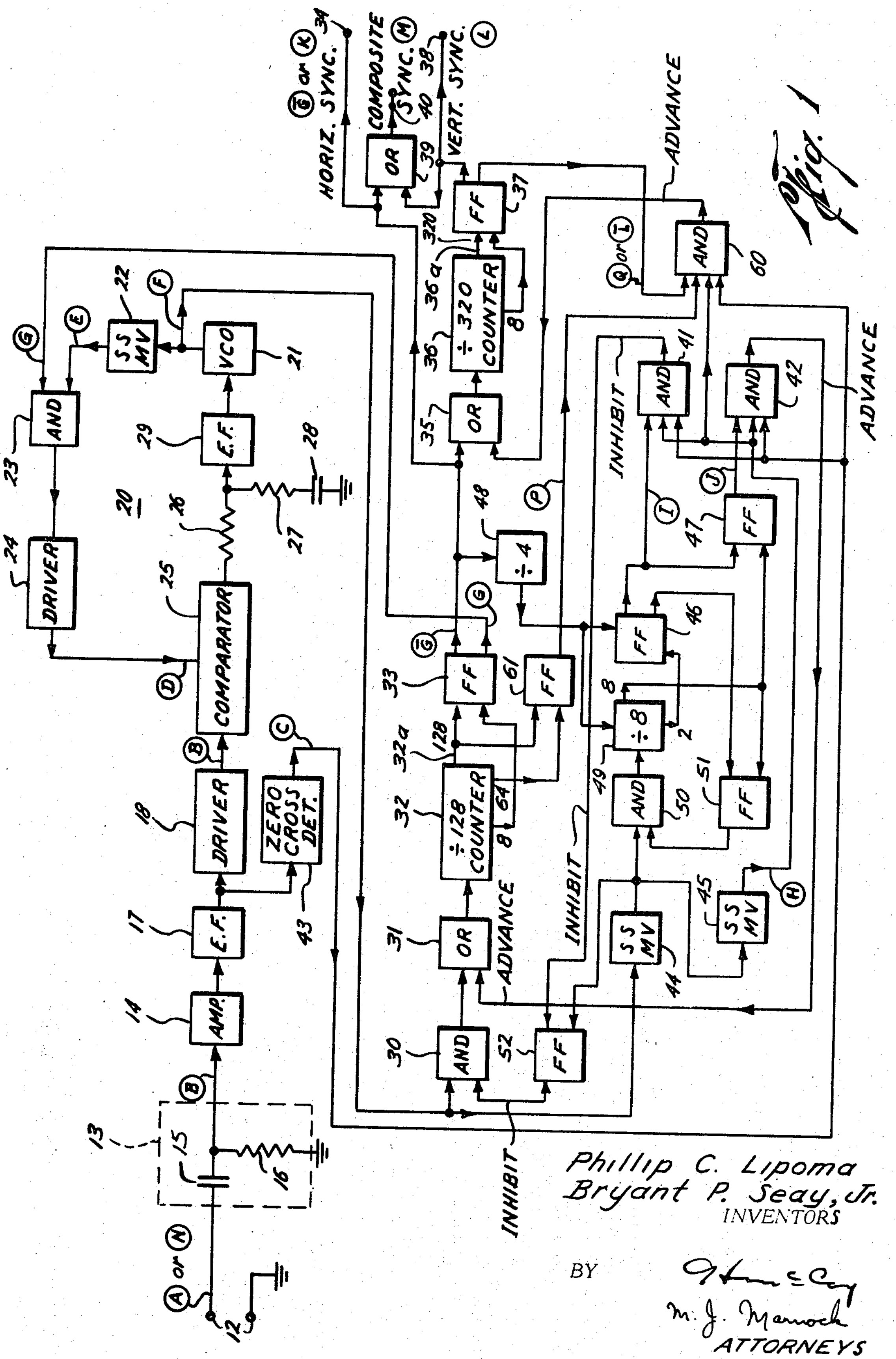
FIG. 1 is a circuit diagram, partly schematic, of a burst sync detection system constructed in accordance with the present invention.

It is helpful to first consider the particular nature of the input signal being received by the detection system and the output signals produced by such system. A portion of the input signal waveform for the planned Apollo television system is represented by waveform N of FIG. 4.

It includes a series of short periodic bursts of a sine wave signal which are used for horizontal deflection synchronization purposes. Typical ones of these bursts are indicated at 10 in waveform N. These bursts are shown to an enlarged scale in waveform A of FIG. 2. As there seen, each burst 10 comprises eight complete cycles of a sine wave signal. The frequency of this sine wave signal or "burst" signal is 409.6 kilohertz.

As shown in waveform A, video picture information, indicated at 11, is located between the horizontal sync bursts 10. The picture information between neighboring horizontal sync bursts represents the information for one line of a complete television picture. Each complete picture (called a "frame") includes 320 lines, except that eight line intervals of each picture are used for vertical deflection synchronization purposes. This vertical sync interval is also shown in waveform N of FIG. 4. It is composed of eight evenly spaced bursts of the same 409.6 kilohertz sine wave signal, each burst comprising approximately 100 cycles of such sine wave signal. This vertical sync interval appears once each picture or frame and the frame rate is 10 frames per second. As a consequence, the repetition rate for the horizontal synchronizing bursts is 3.2 kilohertz.

Figure 3:
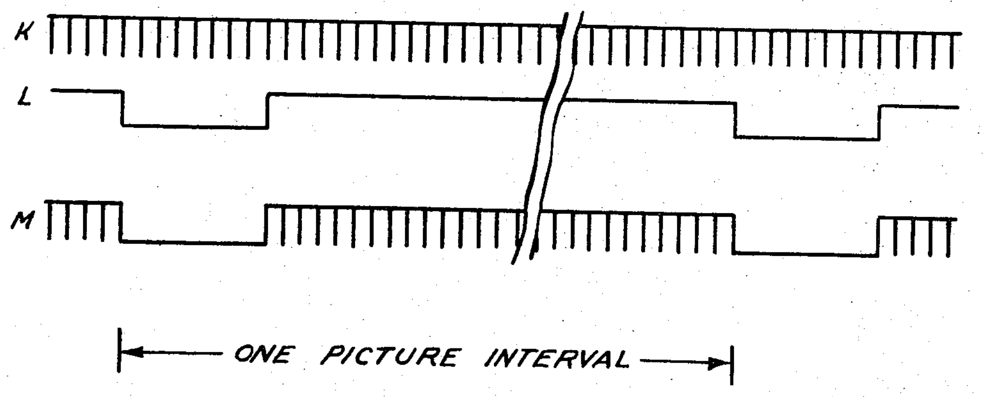
FIG. 3 is a timing diagram showing the output signal waveforms developed by the FIG. 1 system.

FIG. 3 represents the output signal waveforms for the detection system. Waveform K represents the output horizontal sync pulses. The repetition rate of these pulses is 3.2 kilohertz, the same as that of the horizontal bursts in the incoming signal. Waveform L represents the output vertical sync pulses. The repetition rate for these vertical pulses is 10 hertz and the width of each pulse corresponds to eight horizontal line intervals. Waveform M represents a composite of waveforms K and L. This composite signal may be used for blanking purposes in television receiver in which the detection system is incorporated. The signals represented by waveforms K and L, on the other hand, are used for synchronizing the horizontal and vertical cathode ray tube beam deflection systems in the television receiver in which the detection system is incorporated.

Referring to FIG. 1, the incoming television signal is supplied by way of input terminals 12 and a high-pass filter 13 to an amplifier 14. The high-pass filter 13 includes a capacitor 15 and a resistor 16. The lower cutoff point of this filter is at approximately 400 kilohertz. Thus, the filter 13 passes only the 409.3 kilohertz burst signal component plus the higher frequency components of the picture signal proper. The incoming signal at input terminals 12 is represented by waveform A of FIG. 2, while the signal at the input of amplifier 14 is represented by waveform B of FIG. 2. The output of the amplifier 14 is supplied by way of an emitter follower circuit 17 and a driver circuit 18 to a phase locked loop indicated generally at 20.

The phase locked loop 20 includes a voltage controlled oscillator 21 of the crystal-controlled type having a nominal frequency corresponding to the 409.6 kilohertz burst signal frequency. The signal generated by oscillator 21 is represented by waveform F of FIG. 2. This signal is supplied to a single-shot multivibrator 22 to produce a train of relatively narrow pulses having a 409.6 kilohertz repetition rate, these pulses being represented by waveform E of FIG. 2. The output pulses of multivibrator 22 have a pulse width of 0.1 microsecond. These pulses are supplied to a first input of an AND circuit 23. Periodic gating pulses having a pulse width corresponding to eight horizontal line intervals are supplied to the second input of the AND circuit 23. This gating signal is represented by waveform G of FIG. 2. It serves to turn "on" the AND circuit 23 during the higher level pulse portions thereof. Its generation will be discussed hereinafter. The groups of eight burst frequency pulses passed by the AND circuit 23 are supplied by way of a driver circuit 24 to one input of a comparator circuit 25. These pulses, as supplied to the comparator 25, are represented by waveform D of FIG. 2.

Comparator 25 serves to compare these pulses of waveform D with the incoming horizontal sync bursts (waveform B) which are supplied to a second input of the comparator 25 by the driver circuit 18. If the locally generated pulses (waveform D) do not fall on the zero axis crossing points of the burst sine waves, then the comparator 25 develops an output error signal voltage. This error signal voltage is supplied by way of an integrator circuit formed by resistors 26 and 27 and capacitor 28 to an emitter follower circuit 29. The latter supplies the error signal voltage to the voltage control terminal of the voltage controlled oscillator 21. Such error signal voltage operates to adjust the frequency and phase of the oscillator 21 so as to bring the locally-generated 409.6 kilohertz pulses supplied to comparator 25 into accurate alignment with the zero axis crossing points of the incoming burst sine waves. The integrator formed by resistors 26 and 27 and capacitor 28 is a form of low-pass filter and for the case of a "live" incoming television signal is provided with an upper cutoff frequency of approximately 1.5 hertz.

The phase locked loop 20 formed by elements 21–29 thus serves to pull and hold the frequency of oscillator 21 in synchronism with the incoming burst signal frequency. Such phase locked loop 20 provides good noise immunity and enables the generation of synchronizing pulses which are practically free of any jitter problems.

The output pulses generated by the voltage controlled oscillator 21 are supplied by way of an AND circuit 30 and an OR circuit 31 to the input of a frequency divider circuit or pulse counter circuit 32. Counter 32 divides the incoming pulse rate by a factor of 128, thus producing at its primary output terminal **32*a* a train of pulses having a repetition rate which $\frac{1}{128}$ of the 409.6 kilohertz rate. Such output pulses thus have a repetition rate of 3.2 kilohertz, the desired rate for the horizontal sync pulses. These 3.2 kilohertz pulses are supplied to a flip flop circuit 33 for setting it to a second of its two bistable conditions. A "count of 8" output is also taken from the counter 32 and applied to a second input of the flip flop 33 for resetting it to its original condition. This occurs eight counts following each 3.2 kilohertz output pulse from the counter 32**.

Figure 2:
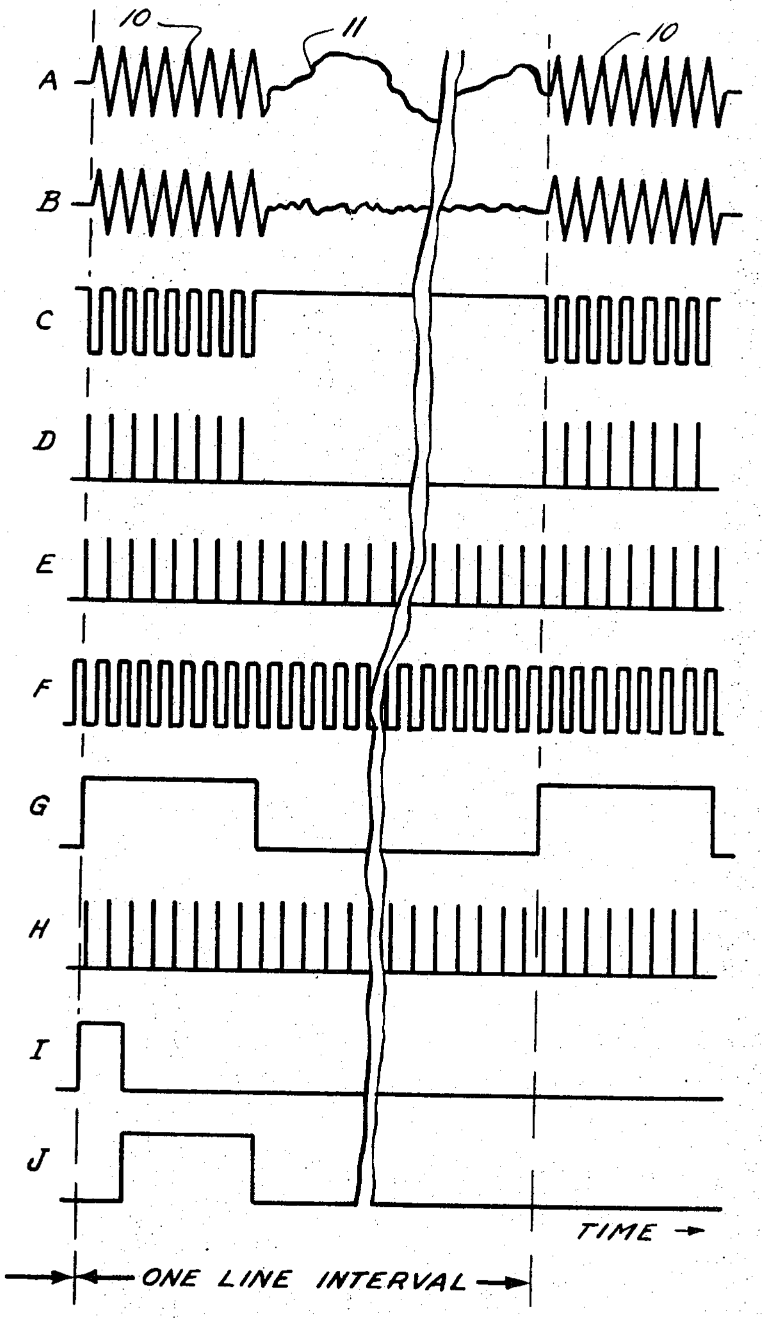
FIG. 2 is a timing diagram showing different signal waveforms appearing at different points in the FIG. 1 system.

Both the positive-going and negative-going output signals of the flip flop 33 are used in the present system. The positive-going output signal, which is represented by waveform G of FIG. 2, is supplied to the AND circuit 23 associated with the phase locked loop 20 previously discussed. The negative-going output signal, which is an inverted replica of waveform G, constitutes the desired horizontal sync pulses and, as such, is supplied directly to a horizontal sync signal output terminal 34. These horizontal sync pulses are also represented by waveform K of FIG. 3, the time scale of FIG. 3 being considerably compressed compared to that of FIG. 2.

The negative-going horizontal sync pulses from the flip flop 33 are also supplied by way of an OR circuit 35 to a frequency divider or pulse counter 36 which divides the incoming pulse repetition rate by a factor of 320. Thus, the pulses at the primary output terminal **36*a* of the counter 36 have a repetition rate of 10 hertz, which is the desired rate for the vertical sync pulses. These 10 hertz pulses are supplied to a flip flop circuit 37 to set it to a second of its two bistable conditions. A "count of 8" output is taken from the counter 36 and supplied to the flip flop 37 for resetting it to its initial condition. Thus flip flop 37 produces the desired vertical sync pulses, two of which are represented in waveform L of FIG. 3. These negative-going pulses are supplied to a vertical sync signal output terminal 38** of the detection system.

Both the horizontal and the vertical sync pulses are supplied to an OR circuit 39 for producing a composite sync signal represented by waveform M of FIG. 3. This composite signal is supplied to the output terminal 40 of the system.

The detection system of FIG. 1 includes a first comparison system for comparing the horizontal sync pulses developed by the system with the horizontal bursts in the incoming signal for purposes of controlling the "horizontal" counter 32 for purposes of bringing the generated horizontal sync pulses exactly into step with or in phase with the incoming horizontal sync bursts. This comparison system includes a pair of signal comparison circuits represented by AND circuits 41 and 42. The output of AND circuit 41 is used to inhibit the counting action of the horizontal counter 32, while the output of AND circuit 42 is used to advance the counting action of the counter 32.

For purposes of comparison, the incoming television signal, as it appears at the output of the emitter follower 17, is supplied by way of a signal shaping circuit in the form of a zero-crossing detector 43 to first inputs of each of the AND circuits 41 and 42. The signal as it appears at the output of the zero-crossing detector 43 is represented by waveform C of FIG. 2. As there indicated, it is a squared up version of the sine wave bursts, the vertical edges in wave form C coinciding with the zero axis crossing points of the burst sine waves (waveform B).

A slightly delayed pulse train derived from the pulse train generated by the voltage controlled oscillator 21 is also supplied to the AND circuits 41 and 42. To this end, the output of the voltage controlled oscillator 21 triggers a first single-shot multivibrator 44 which, in turn, triggers a second single-shot multivibrator 45. The output pulse train from multivibrator 45 is represented by waveform H of FIG. 2. The pulses of this pulse train are delayed by one-quarter of a cycle with respect to the negative-going transitions in the signal from oscillator 21. As such, and assuming that the oscillator 21 is locked on the incoming signal, these delayed pulses of waveform H will be centered on the negative-going excursions of the signal from the zero-crossing detector 43 (waveform C). For purposes of explanation, the delayed pulses from the multivibrator 45 will be referred to as "sample" pulses.

In order to complete the comparison operations, a pair of gating signals are supplied to the AND circuits 41 and 42. A first of these gating signals is produced by a flip flop circuit 46 and is supplied to the AND circuit 41. This gating signal is represented by waveform I of FIG. 2 and has a width corresponding to two of the 409.6 kilohertz intervals. The second of these gating signals is generated by a flip flop circuit 47 and is supplied to the AND circuit 42. This gating signal is represented by waveform J of FIG. 2 and has a width corresponding to six of the 409.6 kilohertz intervals. As indicated in FIG. 2, the gating pulse of waveform I occupies the first one-quarter of the horizontal sync pulse interval, while the gating pulse of waveform J occupies the second three-quarters of the sync pulse interval.

The comparison process is only performed every fourth horizontal sync pulse. The reason for this is to prevent the detection system from locking on to one of the lower order sidebands of the 409.6 kilohertz signal. To this end, the horizontal sync pulses developed by the flip flop circuit 33 are supplied to a frequency divider or pulse counter 48 which divides the pulse repetition rate by a factor of four. The output of the counter 48 is a train of narrow pulses which coincide with the leading edge of every fourth horizontal sync pulse.

The narrow pulses from counter 48 are supplied to the flip flop circuit 46 to set it to a second of its two bistable conditions. These narrow pulses are also supplied to an 8:1 pulse counter 49 for purses of resetting it to its zero count condition. The counter 49 then commences counting the 409.6 kilohertz pulses (like waveform H but not quite as much delay) coming from the multivibrator 44. These 409.6 kilohertz pulses are supplied to the counter 49 by way of an AND circuit 50 which, at this time, is gated to its "on" condition. When the second 409.6 kilohertz pulse is counted by the counter 49, an output pulse appears at the "count of 2" output of such counter and is supplied to the flip flop 46 to reset it to its original condition. This setting and resetting of the flip flop 46 produces one of the one-quarter length gating pulses which are supplied to the AND circuit 41. The trailing edge of this one-quarter length pulse is effective to set the flip flop 47 to a second of its two bistable conditions. When the counter 49 has counted eight of the 409.6 kilohertz pulses, a pulse appears at its "count of 8" output terminal and is supplied to the flip flop 47 for resetting it to its original condition. This causes the flip flop 47 to generate the three-quarter length gating pulse which is supplied to the AND circuit 42.

The AND circuit 50, which is feeding the 409.6 kilohertz pulses to the counter 49, is turned on only during the duration of each horizontal sync pulse for which a comparison is being made. This is accomplished by means of a flip flop circuit 51. This flip flop 51 is set to a second condition by the leading edge of a negative-going output pulse from the flip flop 46, which pulse is produced when such flip flop 46 receives a pulse from the 4:1 counter 48. The flip flop 51 is reset to its initial condition by the "count of 8" output from the counter 49. Thus the appearance of the output signal from the flip flop 51 is like that of waveform G except that a positive-going pulse portion occurs only for every fourth horizontal sync pulse.

For sake of example, it is assumed that each of the AND circuits 41 and 42 employs positive logic. In such case, if all of the signals supplied to one of these AND circuits are at their upper or "positivemost" levels, then an output signal is produced by such AND circuit. If one or more of the input signals, on the other hand, is at its lower level, then no output is produced.

Considering first the AND circuit 41, when the system is "in sync," the positive-going sample pulses from the multivibrator 45 fall in the center of the low level portions of the squared up replica of the incoming burst signal supplied by the zero-crossing detector 43. Since this latter signal is "down" when the samle pulses are "up," no output pulses will be produced by the AND circuit 41 when the quarter-length gating signal from flip flop 46 occurs during the horizontal sync burst interval. If, however, the one-quarter length gating pulse is not quite in step with the burst interval, then, since the signal from detector 43 is "up" outside of such interval, the AND circuit 41 will pass either one or two of the sample pulses depending on how much the quarter-length pulse is out of step with the incoming sync burst.

Pulses passed by the AND circuit 41 are supplied to a flip flop circuit 52 for purposes of resetting such flip flop. This removes the output gating signal from such flip flop, which gating signal had been keeping the AND circuit 30 turned on. After each pulse from the AND circuit 41, flip flop 52 is immediately returned to its set condition by the next occuring pulse from the multivibrator 44. Thus, each pulse supplied by the AND circuit 41 to the flip flop 52 serves to distable the AND circuit 30 for the negative-going triggering transition of only the next following pulse received from oscillator 21. Thus, in effect, the horizontal counter 32 is caused to lose one count each time an error indicating pulse appears at the output of the AND circuit 41. Thus, these pulses may be referred to as "inhibit" pulses.

Considering now the AND circuit 42, a similar type of comparison is made except that this time the three-quarter length pulse occurring during the last three-quarters of the horizontal sync pulse is used. If this three-quarter length pulse does not occur during an incoming sync burst interval, then AND circuit 42 passes one or more (up to six) sample pulses to its output. These error indicating pulses are supplied by way of the OR circuit 31 to the horizontal counter 32. This supplies extra counts to the counter 32, thus causing counter 32 to be advanced.

By means of the inhibiting and advancing of the counting action, the counter 32 acts to shift the resulting horizontal sync pulses produced by flip flop 33 in either a forward or a backward direction relative to the incoming sync bursts. This shifting continues until the horizontal sync pulses coincide with the incoming horizontal sync bursts.

The burst sync detection system of FIG. 1 also includes a second comparison system for comparing the vertical sync pulses generated by the system with the vertical sync intervals in the incoming signal and, if they are not in step with one another, pulling them into step. This vertical comparison system includes a comparison circuit represented by an AND circuit 60. This AND circuit 60 receives four input signals. One is the train of sample pulses obtained from the multivibrator 45. Another is the squared up replica of the incoming signal supplied by the zero-crossing detector 43. A third is a positive-going version of the locally-generated vertical sync pulse signal produced by the flip flop 37. The fourth signal is a train of half line length gating pulses developed by a flip flop circuit 61. This flip flop circuit 61 is placed in its set condition by the "count of 128" output of the counter 32. This corresponds to the beginning of a horizontal line interval. Flip flop 61 is then reset by the "count of 64" output of the counter 32. This corresponds to the midpoint of a horizontal line interval (there being a total of 128 of the 409.6 kilohertz pulses during one horizontal line interval). The output pulse train from flip flop 61 is represented by waveform P of FIG. 4. Its purpose is to enable the comparison-performing AND circuit 60 to look at only the first part of each of the eight successive vertical sync bursts (waveform N). The vertical sync pulse supplied to AND circuit 60 is represented by waveforms Q of FIG. 4. It is an inverted version of the vertical sync pulse waveform used as the system output.

Figure 4:
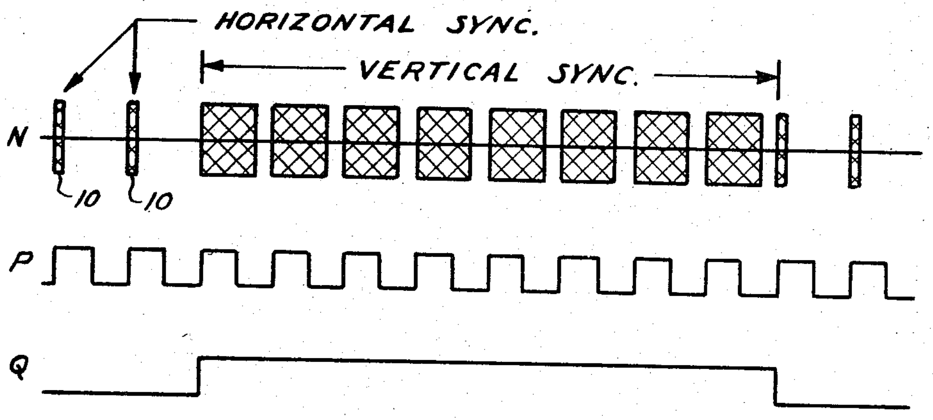
FIG. 4 is a further timing diagram showing various signal waveforms which are used in the vertical sync pulse portion of the FIG. 1 system.

It is again assumed that positive logic is employed. If the vertical sync pulse of waveform Q is in step with the vertical sync burst interval of waveform N, as is indicated in FIG. 4, then no output pulses will be produced by the AND circuit 60, it being remembered that the undulations in the squared up burst waveform are "'down" whenever the sample pulses are "up." Thus, the sample, pulses occuring during the vertical sync burst interval are opposed by the down portions of the squared up burst signal. If, however, the vertical sync pulse of waveform Q should shift slightly to either the right or left, then (assuming waveform P is "up") some of the unopposed sample pulses occurring outside of the vertical sync burst interval will be passed by the AND circuit 60. Such error pulses are supplied by way of the OR circuit 35 to the vertical counter 36. They serve to "advance" the count in such counter 36. This advancing will eventually bring the locally-generated vertical sync pulses into exact step with the vertical sync intervals of the incoming signal.

Summarizing briefly the operation of the burst sync detection system of FIG. 1, the phase locked loop 20 operates to pull the 409.6 kilohertz pulses generated by the oscillator 21 into step with the zero axis crossings of the sine wave signals contained in the sync bursts of the incoming signal. These oscillator pulses are then counted by the counter 32 to produce horizontal synchronizing pulses. These horizontal pulses are counted by the counter 36 to produce vertical synchronizing pulses. While these horizontal and vertical pulses are of the proper width and are stationary with respect to the incoming sync burst singals, they may not be in coincidence with the corresponding horizontal sync and vertical sync intervals of the incoming signal. The locally-generated sync pulses may be shifted to one side or the other with respect to the incoming burst intervals. The digital logic circuits forming the horizontal and vertical signal comparison systems then operate to shift the positions of the locally generated sync pulses until they coincide with the proper intervals in the incoming signal.

After synchronization is established, the output of the detection system of FIG. 1 is accurately locked to the sync bursts of the incoming signal. There is no appreciable time delay between the system output signals and the corresponding components of the incoming signal. Also, the detection system is quite insensitive to noise and to signal level variations in the incoming signal.

It is, of course, not intended that the invention should be limited to the particular waveform parameters and signal frequencies given in the foregoing description. By appropriately changing the system logic and the analog time constants, the system can readily accommodate television signals having other vertical and horizontal deflection frequencies. Also, the usefulness of the present invention is not limited to television systems. It may be used in any communications system which employs a repetitive burst type of synchronizing or timing signal.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A synchronizing signal detection system for use in communications systems which employ repetitive bursts of a sine wave signal for synchronization purposes comprising:
  circuit means for supplying a communications signal including such repetitive sine wave bursts;
  oscillator circuit means for generating pulses having a nominal repetition frequency corresponding to the sine wave signal frequency;
  circuit means responsive to the sine wave signal portion of the communications signal for pulling and holding the oscillator frequency in synchronism with the sine wave signal frequency;
  pulse counter means responsive to the oscillator pulses for generating synchronizing pulses having the same repetition rate as the synchronizing bursts;
  digital logic circuit means responsive to the synchronizing pulses and the synchronizing bursts for pulling and holding the pulses and bursts in phase with one another by controlling the counting action of the pulse counter means;
  signal shaping circuit means for converting the sine wave bursts into corresponding square wave bursts and sample pulse generating means responsive to the oscillator pulses for generating sample pulses which are delayed a fraction of a square wave half cycle and wherein the digital logic circuit means includes circuit means responsive to the square wave bursts, the sample pulses and the synchronizing pulses for producing error pulses for adjusting the counting action of the pulse counter means for pulling the synchronizing pulses into phase with the sine wave bursts.

2. A synchronizing signal detection system in accordance with claim 1 wherein the oscillator circuit means comprises a voltage controlled oscillator and the circuit means responsive to the sine wave signal portion includes comparator circuit means for comparing the sine wave signal portion and the oscillator pulses for developing an error voltage which is supplied to the control circuit portion of the oscillator.

3. A synchronizing signal detection system for use in communications systems which employ repetitive bursts of a sine wave signal for synchronization purposes comprising:

circuit means for supplying a communications signal including such repetitive sine wave bursts;

oscillator circuit means for generating pulses having a nominal repetition frequency corresponding to the sine wave signal frequency;

circuit means responsive to the sine wave signal portion of the communications signal for pulling and holding the oscillator frequency in synchronism with the sine wave signal frequency;

pulse counter means responsive to the oscillator pulses for generating synchronizing pulses having the same repetition rate as the synchronizing bursts;

digital logic circuit means responsive to the synchronizing pulses and the synchronizing bursts for pulling and holding the pulses and bursts in phase with one another by controlling the counting action of the pulse counter means;

signal shaping circuit means for converting the sine wave bursts into corresponding square wave bursts, sample pulse generating means responsive to the oscillator pulses for generating sample pulses which are delayed a fraction of a square wave half cycle and first and second gating signal generating means responsive to at least some of the synchronizing pulses for generating first and second gating signals which coincide with different portions of each synchronizing pulse to which the gating signal generating means are responsive and wherein the digital logic circuit means includes first logic circuit means which is responsive to the square wave bursts, the sample pulses and one of the gating signals for producing error pulses for advancing the counting action of the pulse counter means and second logic circuit means which is responsive to the square wave bursts, the sample pulses and the other of the gating signals for producing error pulses for inhibiting the counting action of the pulse counter means, such advancing and inhibiting serving to hold the synchronizing pulses in phase with the sine wave bursts.

4. A synchronizing signal detection system in accordance with claim 3 wherein the oscillator circuit means comprises a voltage controlled oscillator and the circuit means responsive to the sine wave signal portion includes comparator circuit means for comparing the sine wave signal portion and the oscillator pulses for developing an error voltage which is supplied to the control circuit portion of the oscillator.

References Cited

UNITED STATES PATENTS

| | | | |
|---|---|---|---|
| 2,297,742 | 10/1942 | Campbell | 178—69.5 XR |
| 2,728,812 | 12/1955 | Bedford | 178—69.5 |
| 2,980,762 | 4/1961 | Sonnenfeldt | 178—69.5 |
| 3,112,363 | 11/1963 | Schramel et al | 178—69.5 XR |

RICHARD MURRAY, Primary Examiner